(12) United States Patent
Abdelsalam et al.

(10) Patent No.: US 8,025,963 B2
(45) Date of Patent: Sep. 27, 2011

(54) NANOPOROUS FILTER

(75) Inventors: Mamdouh Abdelsalam, Southampton (GB); Elizabeth Tull, Southampton (GB); Philip Nigel Bartlett, Alresford (GB); Phillip Andrew Nelson, Southampton (GB)

(73) Assignee: Nanotecture Ltd, Southampton (GB)

( * ) Notice: Subject to any disclaimer, the term of this patent is extended or adjusted under 35 U.S.C. 154(b) by 736 days.

(21) Appl. No.: 11/813,345

(22) PCT Filed: Jan. 4, 2006

(86) PCT No.: PCT/GB2006/000020
§ 371 (c)(1),
(2), (4) Date: Jan. 22, 2008

(87) PCT Pub. No.: WO2006/072784
PCT Pub. Date: Jul. 13, 2006

(65) Prior Publication Data
US 2008/0220241 A1 Sep. 11, 2008

(30) Foreign Application Priority Data
Jan. 4, 2005 (GB) .................................. 0500035.1

(51) Int. Cl.
*B32B 3/26* (2006.01)
*B01D 39/20* (2006.01)
*B05D 5/00* (2006.01)

(52) U.S. Cl. ............... 428/315.5; 428/312.8; 428/315.7; 428/314.2; 428/315.9; 428/457; 428/118; 427/244; 427/457; 210/348; 210/473; 210/483

(58) Field of Classification Search .................. None
See application file for complete search history.

(56) References Cited

U.S. PATENT DOCUMENTS

| | | | |
|---|---|---|---|
| 4,203,847 | A | 5/1980 | Grandine, 2nd |
| 4,861,480 | A | 8/1989 | Berardo et al. |
| 4,977,038 | A | 12/1990 | Sieradzki et al. |
| 5,266,207 | A | 11/1993 | Boye et al. |
| 6,044,981 | A | 4/2000 | Chu et al. |
| 6,203,925 | B1 | 3/2001 | Attard et al. |
| 6,395,230 | B1 | 5/2002 | Guerin et al. |
| 6,503,382 | B1 | 1/2003 | Bartlett et al. |

FOREIGN PATENT DOCUMENTS

| | | |
|---|---|---|
| EP | 0242208 A1 | 10/1987 |
| EP | 0537943 A1 | 4/1993 |
| EP | 0676383 A2 | 10/1995 |
| JP | 2001 212401 A | 8/2008 |

OTHER PUBLICATIONS

Attard, G.S. et al., "Mesoporous Platinum Films From Lyotropic Liquid Crystalline Phases," Science, Am. Assoc. for the Advancement of Science, US vol. 278, Oct. 31, 1997, pp. 838-840.

*Primary Examiner* — Ling Xu
(74) *Attorney, Agent, or Firm* — Greenlee Sullivan P.C.

(57) ABSTRACT

A nanoporous filter comprises a porous support having an essentially flat surface on which is deposited a nanoporous layer having a substantially regular pore structure and uniform pore size within the range from 1 to 50 nm.

21 Claims, 4 Drawing Sheets

NANOPOROUS FILTER

CROSS-REFERENCE TO RELATED APPLICATIONS

This application is a U.S. National Stage application of PCT/GB2006/000020, filed Jan. 4, 2006, which in turn claims priority from UK application 0500035.1 filed Jan. 4, 2005. Each of these applications is incorporated by reference herein in its entirety The present invention relates to an improved nanoporous filter and to a method of preparing such a filter.

By "nanoporous filter", we mean a filter having pore sizes of the order of nanometres. In general, the pore sizes of the filters of the present invention may range from 1 to 50 nm, although prior art filters tend to have pore sizes, in most cases, above this range. Moreover, most, although commercially claiming sharply defined cut-offs, in the lower limit of particle size filtered, tend to allow through significant proportions of those particles with sizes greater than this lower cut-off value.

A number of techniques are known for the preparation of microporous filters, for example Cyclopore® or Nuclepore® filters are made by track-etching a polymeric membrane. However, these can generally only achieve pore sizes down to about 15 nm, and the density of pores is very low, for example of the order of $10^8$ per sq. cm. By way of contrast, the pore density of filters of the present invention can be of the order of $10^{11}$ pores/cm$^2$.

We have now discovered that the use of essentially homogeneous lyotropic liquid crystalline phases to prepare, on a suitable support, a porous layer having a substantially regular pore structure and uniform pore size enables us to manufacture nanoporous filters having precisely controllable pore sizes and so controllable cut-off points for filtered material size.

By "essentially homogeneous", we mean that the matter described as "liquid crystalline" has a consistent composition and structure over the majority of its volume when analysed over a volume at least an order of magnitude larger than the dimensions of repeat spacings within the liquid crystalline phases.

By "uniform pore size", we mean that the distribution of pore size and the distance between pores is sufficiently narrow and that the order extends over a sufficient distance; that a diffraction peak can be seen at small angles using a diffractometer. The position of the peak is determined by the distance between the centres of adjacent pores.

The preparation and use of liquid crystalline phases is disclosed in U.S. Pat. Nos. 6,503,382 and 6,203,925, the disclosures of which are incorporated herein by reference.

Thus, the present invention consists in a nanoporous filter comprising a porous support having an essentially flat surface, on which is deposited a nanoporous layer having a substantially regular pore structure and uniform pore size within the range from 1 to 50 nm.

The invention further provides a method of preparing a nanoporous filter by depositing a nanoporous layer having a substantially regular pore structure and uniform pore size within the range from 1 to 50 nm onto a porous support having an essentially flat surface from an essentially homogeneous lyotropic liquid crystalline phase.

By "essentially flat surface", we mean that the majority (i.e. greater than 50%) of the surface, when viewed from a position perpendicular to the plane of the surface, is within a vertical displacement no greater than 2000 nm, where the vertical axis runs perpendicular to the plane of the substrate, i.e. the vertical distance between the highest and the lowest parts of the substrate over a majority of the surface is no more than 2000 nm. Preferably, at least 60% of the surface lies within this vertical displacement, and more preferably at least 70% lies within it. More preferably, the majority of the surface lies within a vertical displacement no greater than 1500 nm, more preferably 1000 nm, still more preferably at least 60% lies within 1500 nm, more preferably 1000 nm, and most preferably at least 70% lies within 1500 nm, more preferably 1000 nm.

It is important that the surface of the substrate should be flat to this degree, as otherwise the nanoporous layer would have to be significantly thicker in order to seal a more contoured surface, sacrificing flow rate performance. At these dimensions, the required surface flatness can also be regarded as a measure of the roughness of the surface.

The nanoporous layer may be on the surface of the porous support or it may be within the pores of the support.

The nanoporous layer has pores of substantially uniform size. In particular, we prefer that at least 75% of pores have pore diameters to within 60%, more preferably within 30%, still more preferably within 10%, and most preferably within 5%, of average pore diameter.

The average pore size of the nanoporous layer is from 1 to 50 nM, preferably from 1 to 20 nm and more preferably from 1.5 to 12 nm.

The thickness of the nanoporous layer is preferably from 5 nm to 1 μm, more preferably from 100 to 500 nm. If the layer is too thin, it will lack physical integrity. On the other hand, if it is too thick, the pressure drop across the layer will be too great and either the flow rate will be too low or it will require too high a pressure to achieve a useable flow rate.

The regular pore structure of the nanoporous layer may for example be cubic, lamellar, oblique, centred rectangular, body-centred orthorhombic, body-centred tetragonal, rhombohedral or hexagonal. Preferably the regular pore structure is hexagonal.

In the method of the invention, a liquid crystalline mixture is formed and a nanoporous material is caused to deposit from it. A variety of methods can be used to effect this deposition, including electrodeposition, electroless deposition, or chemical deposition. Of course, to some extent, the method of deposition used will depend on the nature of the material to be deposited.

For example, one method of preparing the nanoporous filter of the present invention comprises electrodepositing material onto a porous support from a mixture comprising at least one source of said material, an organic directing agent and a solvent; by passing charge through said mixture until sufficient of said material has been deposited to form a nanoporous layer on said porous support; and then removing the organic directing agent to produce a nanoporous layer having a substantially regular pore structure and uniform pore size within the range from 1 to 50 nm on said porous support.

There is no particular restriction on the nature of the material used to form the nanoporous layer in this embodiment of the present invention other than that it must be capable of deposition by electrochemical means. The material may, for example, be a metallic, oxide ceramic, or organic polymeric material.

One or more source materials may be used in the mixture, to produce one or more metals. Thus, by appropriate selection of source material, the composition of the nanoporous layer can be controlled as desired. Suitable metals include for example the first, second and third row transition metals, in particular platinum, palladium, gold, silver, nickel, cobalt, copper, iron, lead, tin and indium, preferably platinum, palladium and nickel, of which platinum and palladium are preferred. The metals may contain surface layers of, for example, oxides, sulphides or phosphides. Suitable source materials include hexachloroplatinic acid, ammonium tetrachloropalladate, nickel chloride, nickel acetate, cobalt chloride, cobalt acetate and copper chloride, preferably hexachloroplatinic acid.

Any type of inorganic compound or mixture of inorganic compounds may be used as the oxide source, but preferably the inorganic compound is a compound of titanium, vanadium, tungsten, manganese, nickel, zinc, silicon and tin.

Any type of organic compound or mixture of organic compounds may be used as the polymer source, but preferably the polymer source is one of aniline, pyrrole and thiophene, or derivatives thereof.

The organic structure-directing agent is included in the mixture in order to impart an homogeneous lyotropic liquid crystalline phase to the mixture. The liquid crystalline phase is thought to function as a structure-directing medium or template for deposition of the nanoporous layer. By controlling the nanostructure of the lyotropic liquid crystalline phase, nanoporous material may be synthesised having a corresponding nanostructure. For example, porous materials formed from normal topology hexagonal phases will have a system of pores disposed on an hexagonal lattice, whereas porous materials formed from normal topology cubic phases will have a system of pores disposed in cubic topology. Similarly, porous materials having a lamellar nanostructure may be deposited from lamellar phases. Accordingly, by exploiting the rich lyotropic polymorphism exhibited by liquid crystalline phases, the method of the invention allows precise control over the structure of the porous materials and enables the synthesis of well-defined porous materials having a long range spatially and orientationally periodic distribution of uniformly sized pores.

Any suitable amphiphilic organic compound or compounds capable of forming an homogeneous lyotropic liquid crystalline phase may be used as structure-directing agent, either low molar mass or polymeric. These may include compounds sometimes referred to as organic directing agents. In order to provide the necessary homogeneous liquid crystalline phase, the amphiphilic compound will generally be used at an high concentration, typically at least about 10% by weight, preferably at least 20% by weight, and more preferably at least 30% by weight, based on the total weight of the solvent, source material and amphiphilic compound.

Preferably, the organic structure-directing agent comprises an organic surfactant compound of the formula RQ wherein R represents a linear or branched alkyl, aryl, aralkyl or alkylaryl group having from 6 to about 60 carbon atoms, preferably from 12 to 18 carbon atoms, and Q represents a group selected from: $[O(CH_2)_m]_nOH$ wherein m is an integer from 1 to about 4 and preferably m is 2, and n is an integer from 2 to about 60, preferably from 4 to 8; nitrogen bonded to at least one group selected from alkyl having at least 4 carbon atoms, aryl, aralkyl and alkylaryl; and phosphorus or sulphur bonded to at least 2 oxygen atoms. Other suitable structure-directing agents include monoglycerides, phospholipids and glycolipids.

Other suitable compounds include surface-active organic compounds of the formula $R_1R_2Q$ wherein $R_1$ and $R_2$ represent aryl or alkyl groups having from 6 to about 36 carbon atoms or combinations thereof, and Q represents a group selected from: $(OC_2H_4)_nOH$, wherein n is an integer from about 2 to about 20; nitrogen bonded to at least two groups selected from alkyl having at least 4 carbon atoms, and aryl; and phosphorus or sulphur bonded to at least 4 oxygen atoms.

Preferably non-ionic surfactants such as octaethylene glycol monododecyl ether ($C_{12}EO_8$, wherein EO represents ethylene oxide) and octaethylene glycol monohexadecyl ether ($C_{16}EO_8$) or commercial products containing mixtures of related molecules are used as organic structure-directing agents. Other preferred organic directing agents include polyoxyalkylene derivatives of propylene glycol, such as those sold under the trade mark "Pluronic", and ionic surfactants such as CTAB It has been found that the pore size of the porous metal can be varied by altering the hydrocarbon chain length of the surfactant used as structure-directing agent, or by supplementing the surfactant by an hydrocarbon additive. For example, shorter-chain surfactants will tend to direct the formation of smaller-sized pores whereas longer-chain surfactants tend to give rise to larger-sized pores. The addition of an hydrophobic hydrocarbon additive such as n-heptane, to supplement the surfactant used as structure-directing agent, will tend to increase the pore size, relative to the pore size achieved by that surfactant in the absence of the additive. Also, the hydrocarbon additive may be used to alter the phase structure of the liquid crystalline phase in order to control the corresponding regular structure of the porous metal. By a suitable combination of these methods, it is possible to control the pore size very precisely and over a wide range, extending to much smaller pore sizes (of the order of 1 nm) than could be achieved hitherto.

The solvent is included in the mixture in order to dissolve the source material and to form a liquid crystalline phase in conjunction with the organic structure-directing agent, thereby to provide a medium for deposition of the nanoporous material. Generally, water will be used as the preferred solvent. However, in certain cases it may be desirable or necessary to carry out the deposition in a non-aqueous environment. In these circumstances a suitable organic solvent may be used, for example formamide or ethylene glycol.

In most cases, the source material will dissolve in the solvent domains of the liquid crystalline phase, but in certain cases the source material may be such that it will dissolve in the hydrophobic domains of the phase.

The mixture may optionally further include a hydrophobic hydrocarbon additive to modify the pore diameter of the porous metal, as explained more fully above. Suitable hydrocarbon additives include n-heptane, n-tetradecane and mesitylene. The hydrocarbon additive may be present in the mixture in a molar ratio to the structure-directing agent in the range of 0.1 to 4, preferably 0.5 to 1.

Transmission electron microscopy shows the presence of pores of uniform sizes to within 30% of the average pore size.

Alternatively, the material of which the nanoporous layer is formed may be deposited by electroless deposition. The procedure used to fabricate a filter by electroless deposition is essentially the same as that used in chemical deposition, described below. The essential difference is that, prior to application of the liquid crystal template to the porous support, the support is sensitised with a metal salt in order to promote deposition of the nanoporous material only on the support surface rather than throughout the liquid crystal. In summary, the reduction of a metal salt to a metal is facilitated by an appropriate reducing agent just as in chemical deposition. The presence of the sensitiser confines this deposition to the support surface. A suitable sensitiser is tin (II) chloride.

As a further alternative, the material of which the nanoporous layer is formed may be a metal or other material capable of deposition by reduction or other chemical reaction. In this case, the mixture comprises a source material for the metal or other material, dissolved in a solvent, and a sufficient amount of an organic structure-directing agent to provide an homogeneous lyotropic liquid crystalline phase for the mixture.

One or more source materials may be used in the mixture, for reduction to one or more metals. Thus, by appropriate selection of source material, the composition of the porous metal can be controlled as desired. Suitable metals include those described above in relation to the electrodeposition method.

A reducing agent is used to reduce the mixture. Suitable reducing agents include metals (such as zinc, iron or magnesium), sodium hypophosphite, dimethyl borane, hydrogen gas, and hydrazine, preferably dimethyl borane.

The structure directing agents and solvents used in this embodiment may be any of those described above in relation to the electrodeposition method.

Typically, the pH of the mixture may be adjusted to a value in the range from 2 to 12. The temperature is generally maintained in the range from 15 to 100° C., preferably 18 to 80° C., more preferably 20 to 40° C.

The mixture and reducing agent are left to stand for a sufficient period to precipitate the porous metal, typically overnight at room temperature. Depending on the nature of the reactants, the mixture may be left for a period of from 15 minutes to 4 weeks, and typically for about 24 hours. Following the reduction, it will usually be desirable to treat the porous metal to remove the organic material including the structure-directing agent, hydrocarbon additive, unreacted source material and ionic impurities, for example by solvent extraction or by decomposition in nitrogen and combustion in oxygen (calcination). However, for certain applications such treatment may not be necessary.

The porous metal may then optionally be subjected to further treatment, for example, to chemical treatment to form surface layers, for example by reaction with hydrogen sulphide gas to form metal sulphide or by adsorption of alkane thiols or other surface active materials, or to physical treatment, for example by adsorption of proteins such as enzymes, or by doping with Group I or II metals.

The regular pore structure of the porous metal may for example be cubic, lamellar, oblique, centred rectangular, body-centred orthorhombic, body-centred tetragonal, rhombohedral or hexagonal. Preferably the regular pore structure is hexagonal.

A further alternative is to deposit a salt and to calcine it to a ceramic oxide. For example, in one such procedure, a surfactant or templating material, e.g. Pluronic P123 or F127, is dissolved in a mixture of methanol and concentrated hydrochloric acid. Optionally a swelling agent can be added to the mixture. A precursor salt or complex, such as $Ti(OEt)_4$ (titanium ethoxide) which can be converted to a ceramic oxide is also then added. This mixture can then be coated onto the porous support by methods such as dip coating (in which case the underside of the porous support needs to be protected in some way) or by using a K-bar coater. After coating the filter is washed and rinsed and dried at, for example, 45° C. and then calcined at, for example, 400° C. This results in a mesoporous thin titania film supported on a porous support. The film has a pore size ~5-6 nm and shows small angle X-ray scattering.

The nature of the porous support is not critical to the invention, since its function is simply to give mechanical support to the nanoporous layer. It is preferred that the material of which it is made should be inert, at least to the substances with which it is expected to come into contact, and, in order to function as a support, it necessarily has a certain mechanical strength. It may, for example, be a metal, such as platinum, a ceramic or a polymer, such as a polycarbonate, and may be one of the currently available microfilters. The pores in the porous support should preferably be from 100 nm to 1 micron in size. If they are too large, then they will provide little physical support to the nanoporous layer. If they are too small, they will impede the flow of fluid through the filter.

In the case where the nanoporous filter layer is to be applied to the support by electrochemical deposition, it is necessary that the support should be capable of acting as an electrode in an electrochemical cell. Where the material of the support is not, in itself, electrically conducting, it may be coated with a conducting material, e.g. gold, using techniques well known in the art, prior to application of the nanoporous filter layer.

It is also possible to refine the selection of matter passing through or trapped by the nanoporous filter of the present invention by applying an electrical charge, which may vary over the face of the filter, to the nanoporous layer. In this case, it is preferred that the nanoporous layer should be composed of a metal or other electrically conductive material.

Figure 1:
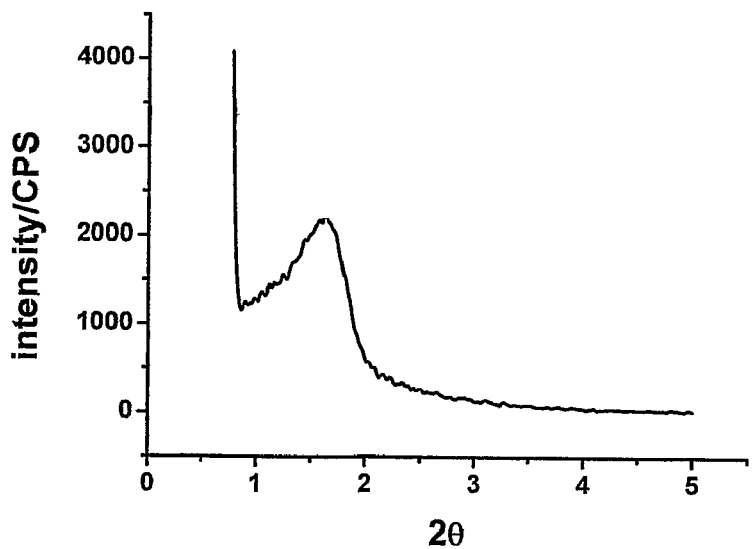
FIG. 1 illustrates small angle x-ray scattering (SAXS) measurements of a mesoporous Pt film deposited from the $H_I$ phase of a Brij 56 template having 60 wt % of Brij 56 and 40 wt % of an aqueous solution containing 1.9 M of hexachloroplatinic acid at −0.1 V vs. SCE at 25° C. onto the surface of a gold coated polycarbonate membrane.

The invention is further illustrated by the following non-limiting Examples.

EXAMPLE 1

Electrodeposition of 100 nm Thick Mesoporous Pt on a Polycarbonate Membrane

The surface of a track etched polycarbonate membrane with 0.22 μm pore size was used as a substrate for the electrodeposition of a mesoporous platinum film. 80% of the surface area of the substrate when viewed from a position perpendicular to the plane of the substrate is vertically displaced within a 500 nm range where the vertical axis runs perpendicular to the plane of the substrate.

To make the polycarbonate membrane conducting and therefore facilitate the electrodeposition, the membrane was coated with a gold layer of 35 nm thickness by sputter coating. A mesoporous Pt film was electrodeposited on the bare gold coated membrane using a liquid crystal template. The liquid crystal mixture was prepared from 60 wt % of Brij 56 and 40 wt % of an aqueous solution of 1.9 M hexachloroplatinic acid (HCPA). The mixture was heated for 10 minutes at 40° C. It was then mixed manually with a glass rod for 10 minutes, followed by sonication for 20 minutes. The steps of heating, mixing and sonication were repeated at least three times to ensure the complete homogeneity of the mixture. Then the mixture was allowed to cool to the electrodeposition temperature of 25° C. The sonication process allows the air bubbles to be removed from the mixture, giving a uniform coating. Investigation of the liquid crystal by polarised light microscopy revealed that the mixture had the optical texture characteristic of an hexagonal liquid crystal phase.

The templating liquid crystal was sandwiched between the gold surface of the polymer membrane and a carbon counter electrode. A calomel reference electrode was included. The electrodeposition of the Pt film was achieved under potentiostatic and thermostatic control, with a reducing deposition potential of −0.1 V vs. SCE at 25° C. The deposited film thickness was controlled by passing the required deposition charge as calculated by Faraday's Law. The electrodeposition efficiency was 75% and the porosity of the film 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Pt mesoporous films deposited on the membrane were characterized electrochemically by cycling in 2 M $H_2SO_4$ aqueous sulphuric acid between −0.2 V and 1.2 V vs. SCE at a scan rate of 200 mV s-1. The film was deposited with a charge density of 0.45 C cm$^{-2}$. The surface area enhancement over a flat Pt surface of an electrodeposited film was determined by integrating the current passed during the forward and reverse cycles within the range 0.2 V to −0.2 V vs. SCE, subtracting the charge associated with the double layer, halving the result (because the integration was carried out over both forward and reverse cycles), and finally converting to a surface area measurement (in units of squared centimetres) assuming a conversion factor of 210 μC cm$^{-2}$. This surface area measurement was divided by the geometric area of the electrode to produce a value of 35 for the roughness factor.

SAXS Results

Small angle x-ray scattering (SAXS) measurements on a mesoporous Pt film deposited from the $H_I$ phase of a Brij 56 based template onto the surface of a gold coated polycarbonate membrane showed strong scattering at low angles indicating the presence of a well ordered mesostructure. The small angle reflection peak derived from x-ray scattering analysis of mesoporous Pt deposited onto the surface of a gold coated polycarbonate membrane from a 60 wt % of Brij 56 and 40 wt % of an aqueous solution containing 1.9 M of hexachloroplatinic acid at −0.1 V vs. SCE at 25° C. is shown in FIG. 1.

FIG. 1 allows calculation of a d spacing of 5.45 nm which corresponds to a pore to pore distance of 6.29 nm, assuming the mesostructure has an $H_I$ structure.

Figure 2:
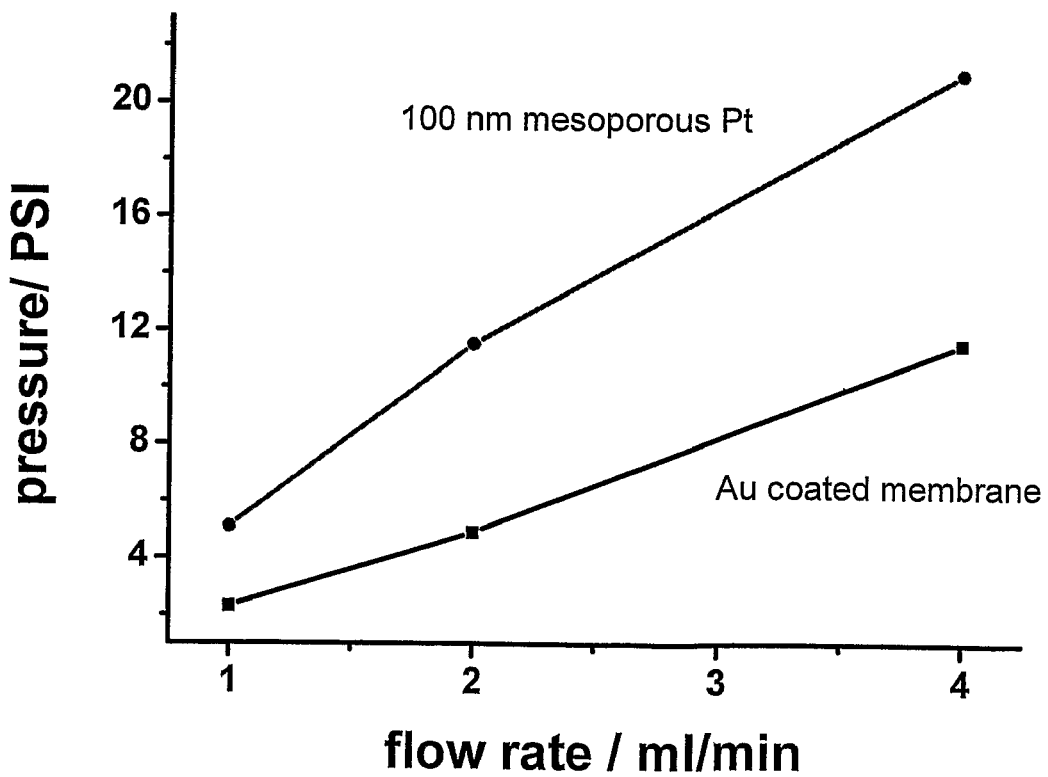
FIG. 2 is a graph of pressure (PSI) as a function of flow rate (mL/min) of a 10 mM KCl solution through a bare gold coaled polycarbonate membrane (squares) and through the same membrane with a 100 nm thick film of mesoporous Pt (Circles). The mesoporous Pt film was electrodeposited on the membrane from the Brij 56 template having 60 wt % of Brij 56 and 40 wt % of an aqueous solution containing 1.9 M hexachloroplatinic acid.

To demonstrate fluid transfer through the mesoporous Pt film/polycarbonate membrane system, the flow rate of 10 mM KCl solution through a bare gold coated polycarbonate membrane and the same membrane with a 100 nm thick mesoporous Pt film was investigated. As shown in FIG. 2, as the flow rate of the solution through the filter increases the pressure also increases as expected. The measurement of flow through the filter indicates the presence of a continuous flow path through the mesoporous Pt film and the supporting polymer layer. FIG. 2 shows the flow rate of 10 mM KCl aqueous solution through the gold coated membrane (black line) and the membrane with a 100 nm thick film of mesoporous Pt.

EXAMPLE 2

Electrodeposition of 150 nm Thick Mesoporous Pt on a Polycarbonate Membrane

The surface of a track etched polycarbonate membrane with 0.22 μm pore size was used as a substrate for the electrodeposition of a mesoporous platinum film. 80% of the surface area of the substrate when viewed from a position perpendicular to the plane of the substrate is vertically displaced within a 500 nm range where the vertical axis runs perpendicular to the plane of the substrate.

To make the polycarbonate membrane conducting and therefore facilitate the electrodeposition, the membrane was coated with a gold layer of 35 nm thickness by sputter coating. A mesoporous Pt film was electrodeposited on the bare gold coated membrane using a liquid crystal template. The liquid crystal mixture was prepared from 60 wt % of Brij 56 and 40 wt % of an aqueous solution of 1.9 M hexachloroplatinic acid (HCPA). The mixture was heated for 10 minutes at 40° C. It was then mixed manually with a glass rod for 10 minutes, followed by sonication for 20 minutes. The steps of heating, mixing and sonication were repeated at least three times to ensure the complete homogeneity of the mixture. The mixture was then allowed to cool to the electrodeposition temperature of 25° C. The sonication process allowed the air bubbles to be removed from the mixture, giving a uniform coating. Investigation of the liquid crystal by polarised light microscopy revealed that the mixture had the optical texture characteristic of an hexagonal liquid crystal phase.

The templating liquid crystal was sandwiched between the gold surface of the polymer membrane and a carbon counter electrode. A calomel reference electrode was included. The electrodeposition of the Pt films was achieved under potentiostatic and thermostatic control, with a reducing deposition potential of −0.1 V vs. SCE at 25° C. The deposited film thickness was controlled by passing the required deposition charge as calculated by Faraday's Law. The electrodeposition efficiency was 75% and the porosity of the film 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Pt mesoporous films deposited on the membrane were characterized electrochemically by cycling in 2 M $H_2SO_4$ aqueous sulphuric acid between −0.2 V and 1.2 V vs. SCE at a scan rate of 200 mV s−1. The film was deposited with a charge density of 0.67 C $cm^{-2}$. The surface area enhancement over a flat Pt surface of an electrodeposited film was determined by integrating the current passed during the forward and reverse cycles within the range 0.2 V to −0.2 V vs. SCE, subtracting the charge associated with the double layer, halving the result (because the integration was carried out over both forward and reverse cycles), and finally converting to a surface area measurement (in units of squared centimetres) assuming a conversion factor of 210 µC $cm^{-2}$. This surface area measurement was divided by the geometric area of the electrode to produce a value of 55 for the roughness factor.

Figure 3:
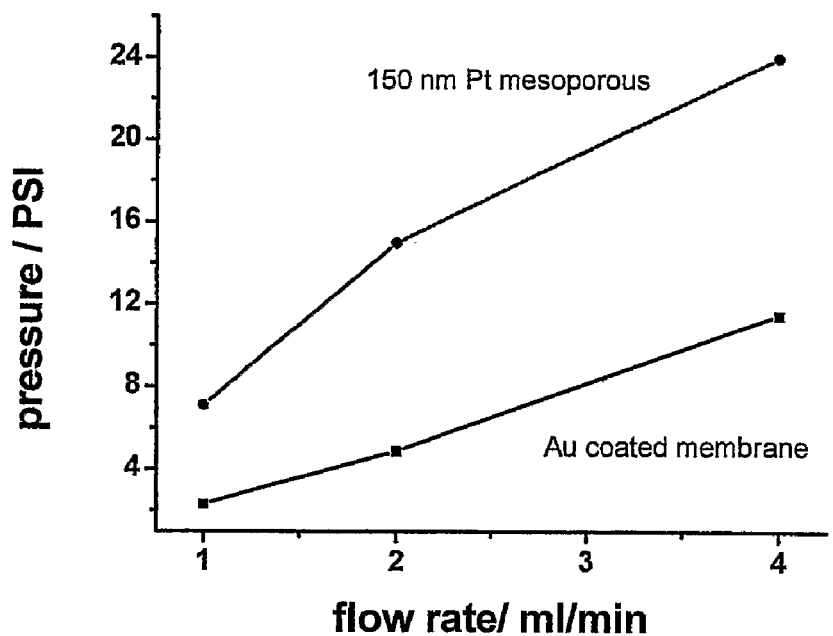
FIG. 3 is a graph of pressure (PSI) as a function of flow rate (mL/min) of a 10 mM KCl solution through a bare gold coated polycarbonate membrane (squares) and through the same membrane with a 150 nm thick film of mesoporous Pt (circles). The mesoporous Pt film was electrodeposited on the membrane from the Brij 56 template having 60 wt % of Brij 56 and 40 wt % of an aqueous solution containing 1.9 M hexachloroplatinic acid.

To demonstrate fluid transfer through the mesoporous Pt film/polycarbonate membrane system, the flow rate of 10 mM KCl solution through a bare gold coated polycarbonate membrane and the same membrane with a 150 nm thick mesoporous Pt film was investigated. As shown in FIG. 3, as the flow rate of the solution through the filter increases, the pressure also increases, as expected. The measurement of flow through the filter indicates the presence of a continuous flow path through the mesoporous Pt film and the supporting polymer layer. FIG. 3 shows the flow rate of 10 mM KCl aqueous solution through the gold coated membrane (black line) and the membrane with a 150 nm thick film of mesoporous Pt.

EXAMPLE 3

Electrodeposition of Mesoporous Pt from Pluronic P123

The surface of a track etched polycarbonate membrane with 0.22 µm pore size was used as a substrate for the electrodeposition of a mesoporous platinum film. 80% of the surface area of the substrate when viewed from a position perpendicular to the plane of the substrate is vertically displaced within a 500 nm range where the vertical axis runs perpendicular to the plane of the substrate.

To make the polycarbonate membrane conducting and therefore facilitate the electrodeposition, the membrane was coated with a gold layer of 35 nm thickness by sputter coating. A mesoporous Pt film was electrodeposited on the bare gold coated membrane using a liquid crystal template. The liquid crystal mixture was prepared from 55 wt % of Pluronic block copolymer surfactant P123 (with formula $[EO]_{20}[PO]_{70}[EO]_{20}$) and 45 wt % of an aqueous solution containing 1.5 M of hexachloroplatinic acid (HCPA). The mixture was heated for 10 minutes at 40° C. It was then mixed manually with a glass rod for 10 minutes, followed by sonication for 20 minutes. The steps of heating, mixing and sonication were repeated at least three times to ensure the complete homogeneity of the mixture. The mixture was then allowed to cool to the electrodeposition temperature of 25° C. The sonication process allowed the air bubbles to be removed from the mixture giving a uniform coating. Investigation of the liquid crystal by polarised light microscopy revealed that the mixture had the optical texture characteristic of an hexagonal liquid crystal phase.

The templating liquid crystal was sandwiched between the gold surface of the polymer membrane and a carbon counter electrode. A calomel reference electrode was included. The electrodeposition of the Pt films was achieved under potentiostatic and thermostatic control, with a reducing deposition potential of −0.1 V vs. SCE at 25° C. The deposited film thickness was controlled by passing the required deposition charge as calculated by Faraday's Law. The electrodeposition efficiency was 75% and the porosity of the film 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Pt mesoporous films deposited on the membrane were characterized electrochemically by cycling in 2 M $H_2SO_4$ aqueous sulphuric acid between −0.2 V and 1.2 V vs. SCE at a scan rate of 200 mV $s^{-1}$. The film was deposited with a charge density of 0.45 C $cm^{-2}$. The surface area enhancement over a flat Pt surface of an electrodeposited film was determined by integrating the current passed during the forward and reverse cycles within the range 0.2 V to −0.2 V vs. SCE, subtracting the charge associated with the double layer, halving the result (because the integration was carried out over both forward and reverse cycles), and finally converting to a surface area measurement (in units of squared centimetres) assuming a conversion factor of 210 µC $cm^{-2}$. This surface area measurement was divided by the geometric area of the electrode to produce a value of 26 for the roughness factor.

SAXS Results

Figure 4:
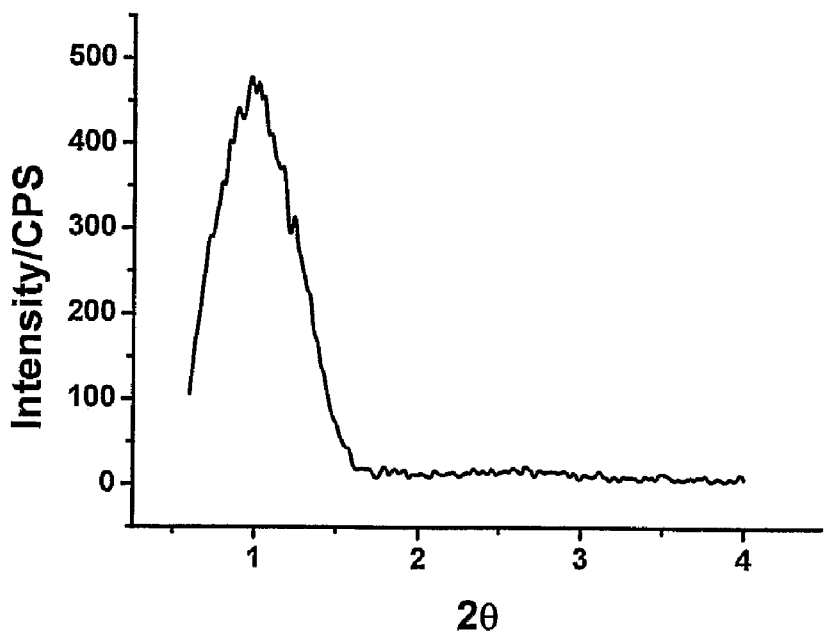
FIG. 4 illustrates small angle x-ray scattering (SAXS) measurements of a mesoporous Pt film deposited from the $H_I$ phase of a Pluronic P123 template having 55 wt % of Pluronic P123 and 45 wt % of an aqueous solution containing 1.5 M of hexachloroplatinic acid at −0.1 V vs. SCE at 25° C. onto the surface of a gold coated polycarbonate membrane.

Small angle x-ray scattering (SAXS) measurements on a mesoporous Pt film deposited from the $H_I$ phase of a Pluronic P123 based template onto the surface of a gold coated polycarbonate membrane shows strong scattering at low angles indicating the presence of a well ordered mesostructure. FIG. 4 Shows a small angle reflection peak derived from x-ray scattering analysis of mesoporous Pt deposited from a 55 wt % of Pluronic P123 and 45 wt % of an aqueous solution containing 1.5 M of Hexachloroplatinic acid at −0.1 V vs. SCE at 25° C.

FIG. 4 allows calculation of a d spacing of 9 nm which corresponds to a pore to pore distance of 10.4 nm, assuming the mesostructure has an $H_I$ structure.

Figure 5:
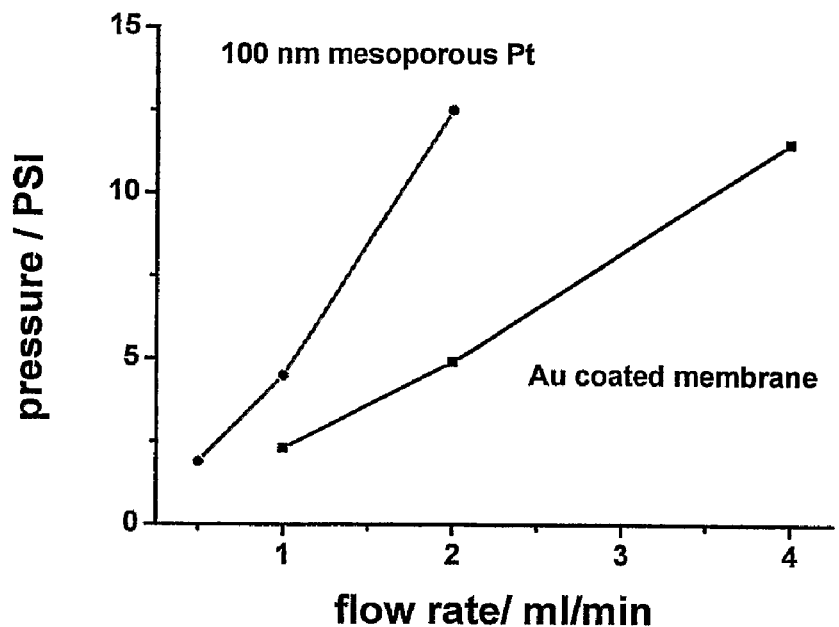
FIG. 5 is a graph of pressure (PSI) as a function of flow rate (mL/min) of a 10 mM KGI solution through a bare gold coated polycarbonate membrane (squares) and through the same membrane with a 100 nm thick film of mesoporous Pt (circles). The mesoporous Pt film was electrodeposited on the membrane from the Pluronic P123 template having 55 wt % of Pluronic P123 and 45 wt % of an aqueous solution containing 1.5 M of hexachloroplatinic acid.

To demonstrate fluid transfer through the mesoporous Pt film/polycarbonate membrane system, the flow rate of 10 mM KCl solution through a bare gold coated polycarbonate membrane and the same membrane with a 100 nm thick mesoporous Pt film was investigated. As shown in FIG. 5, as the flow rate of the solution through the filter increased, the pressure also increased, as expected. The measurement of flow through the filter indicated the presence of a continuous flow path through the mesoporous Pt film and the supporting polymer layer. FIG. 5 shows the flow rate of 10 mM KCl aqueous solution through the gold coated membrane (black line) and the membrane with a 100 nm thick film of mesoporous Pt.

EXAMPLE 4

Electrodeposition of 400 nm Thick Mesoporous Pt on a Polycarbonate Membrane

The surface of a track etched polycarbonate membrane with 0.22 um pore size was used as a substrate for the electrodeposition of a mesoporous platinum film. 80% of the surface area of the substrate when viewed from a position perpendicular to the plane of the substrate is vertically displaced within a 500 nm range where the vertical axis runs perpendicular to the plane of the substrate.

To make the polycarbonate membrane conducting and therefore facilitate the electrodeposition, the membrane was coated with a gold layer of 35 mm thickness by sputter coating. A mesoporous Pt film was electrodeposited on the bare gold coated membrane using a liquid crystal template. The liquid crystal mixture was prepared from 60 wt % of Brij 56 and 40 wt % of an aqueous solution of 1.9 M hexachloroplatinic acid (HCPA). The mixture was heated for 10 minutes at 40° C. It was then mixed manually with a glass rod for 10 minutes, followed by sonication for 20 minutes. The steps of heating, mixing and sonication were repeated at least three times, to ensure the complete homogeneity of the mixture. The mixture was then allowed to cool to the electrodeposition temperature of 25° C. The sonication process allowed the air bubbles to be removed from the mixture, giving a uniform coating. Investigation of the liquid crystal by polarised light microscopy revealed that the mixture had the optical texture characteristic of an hexagonal liquid crystal phase.

The templating liquid crystal was sandwiched between the gold surface of the polymer membrane and a carbon counter electrode. A calomel reference electrode was included. The electrodeposition of the Pt films was achieved under potentiostatic and thermostatic control, with a reducing deposition potential of −0.1 V vs. SCE at 25° C. The deposited film thickness was controlled by passing the required deposition charge as calculated by Faraday's Law. The electrodeposition efficiency was 75% and the porosity of the film 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Pt mesoporous films deposited on the membrane were characterized electrochemically by cycling in 2 M $H_2SO_4$ aqueous sulphuric acid between −0.2 V and 1.2 V vs. SCE at a scan rate of 200 mV $s^{-1}$. A Pt film of 400 nm thickness was deposited with a charge density of 1.79 C $cm^{-2}$. The surface area enhancement over a flat Pt surface of an electrodeposited film was determined by integrating the current passed during the forward and reverse cycles within the range 0.2 V to −0.2 V vs. SCE, subtracting the charge associated with the double layer, halving the result (because the integration was carried out over both forward and reverse cycles), and finally converting to a surface area measurement (in units of squared centimetres) assuming a conversion factor of 210 μC $cm^{-2}$.

Figure 6:
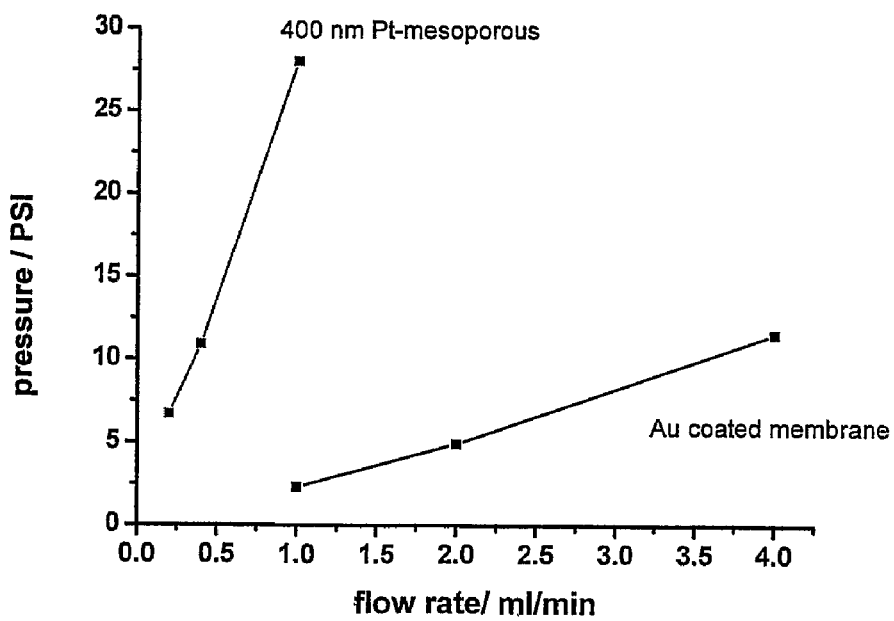
FIG. 6 is a graph of pressure (PSI) as a function of now rate (mL/min) of a 10 mM KCl solution through a bare gold coated polycarbonate membrane (squares) and through the same membrane with a 400 nm thick film of mesoporous Pt (circles). The mesoporous Pt film was electrodeposited on the membrane from the Pluronic P123 template having 55 wt % of Pluronic P123 and 45 wt % of an aqueous solution containing 1.5 M of hexachloroplatinic acid.

To demonstrate the validity of using the mesoporous Pt film on top of the PC membrane as a filter, the flow rate of 10 mM KCl solution through a bare gold coated membrane (black line) and the membrane with a 400 nm thick mesoporous Pt film was investigated. As shown in FIG. 6, as the flow rate increases the pressure also increases.

EXAMPLE 5

Electrodeposition of Mesoporous Pt on a Polyether Sulphone Membrane

A polyether sulphone membrane with 0.22 μm pore size was used as a substrate for the electrodeposition of a mesoporous platinum film. 70% of the surface area of the substrate when viewed from a position perpendicular to the plane of the substrate is vertically displaced within a 1000 nm range where the vertical axis runs perpendicular to the plane of the substrate.

To make the polyether sulphone membrane conducting and therefore facilitate the electrodeposition, the membrane was coated with a gold layer of 120 nm thickness by evaporate coating. A mesoporous Pt film was electrodeposited on the bare gold coated membrane using a liquid crystal template. The liquid crystal mixture was prepared from 0.5 g of hexachloroplatinic acid (HCPA), 0.75 g of Brij 56 and 0.5 g of water by alternate mixing and gentle heating procedures. The mixture was heated for 10 minutes at 40° C. It was then mixed manually with a glass rod for 10 minutes. followed by sonication for 20 minutes. The steps of heating, mixing and sonication were repeated at least three times to ensure the complete homogeneity of the mixture. The mixture was then allowed to cool to the electrodeposition temperature of 25° C. The sonication process allowed the air bubbles to be removed from the mixture, giving a uniform coating. Investigation of the liquid crystal by polarised light microscopy revealed that the mixture had the optical texture characteristic of an hexagonal liquid crystal phase.

The templating liquid crystal was sandwiched between the gold surface of the polymer membrane and a Pt mesh counter electrode. A calomel reference electrode was included. The electrodeposition of the Pt films was achieved under potentiostatic and thermostatic control, with a reducing deposition potential of −0.1 V vs. SCE at 25° C. The deposited film thickness was controlled by passing the required deposition charge of 4.04 C $cm^{-2}$ as calculated by Faraday's Law. The electrodeposition efficiency was a proximately 65% and the porosity of the film was 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Pt mesoporous films deposited on the membrane were characterized electrochemically by cycling in 2 M $H_2SO_4$ aqueous sulphuric acid between −0.2 V and 1.2 V vs. SCE at a scan rate of 200 mV $s^{-1}$. The surface area enhancement over a flat Pt surface of an electrodeposited film was determined by integrating the current passed during the forward and reverse cycles within the range 0.2 V to −0.2 V vs. SCE, subtracting the charge associated with the double layer, halving the result (because the integration was carried out over both forward and reverse cycles), and finally converting to a surface area measurement (in units of squared centimetres) assuming a conversion factor of 210 μC $cm^{-2}$. This surface area measurement was divided by the geometric area of the electrode to produce a value of 106 for the roughness factor.

EXAMPLE 6

Electrodeposition of Mesoporous Ni film on a Polycarbonate Membrane

The surface of a track etched polycarbonate membrane with 0.22 μm pore size was used as a substrate for the electrodeposition of a mesoporous platinum film. 80% of the surface area of the substrate when viewed from a position perpendicular to the plane of the substrate is vertically displaced within a 500 nm range where the vertical axis runs perpendicular to the plane of the substrate.

To make the polycarbonate membrane conducting and therefore facilitate the electrodeposition, the membrane was coated with a gold layer of 35 nm thickness by sputter coating. A mesoporous Pt film was electrodeposited on the bare gold coated membrane using a liquid crystal template. The liquid crystal mixture was prepared from 50 wt % of octaethylene glycol monohexadecyl ether ($C_{16}EO_8$) and 50 wt % of an aqueous solution of 0.2 M nickel acetate, 0.5 M sodium acetate and 0.2 M boric acid. In preparing the mixtures, the surfactant was heated to ~60° C. (above its melting point) in a glass vial and mixed manually using a glass rod on addition of the aqueous solution. Mixing times of ~10 minutes were required to obtain an homogeneous mixture. Complete mixing was confirmed by homogeneity of the colour of the liquid crystals. Investigation of the liquid crystal by polarized light microscopy revealed that the mixture had the optical texture characteristic of an hexagonal liquid crystal phase. Prior to the commencement of electrodeposition, the liquid crystalline electrolyte was heated to approximately 60° C. and then allowed to cool to the deposition temperature. This process essentially annealed the liquid crystal, allowing internal stresses in the mesophase to be relieved. In combination with the cooling period, this annealing resulted in the formation of a more continuous and ordered phase structure.

Figure 7:
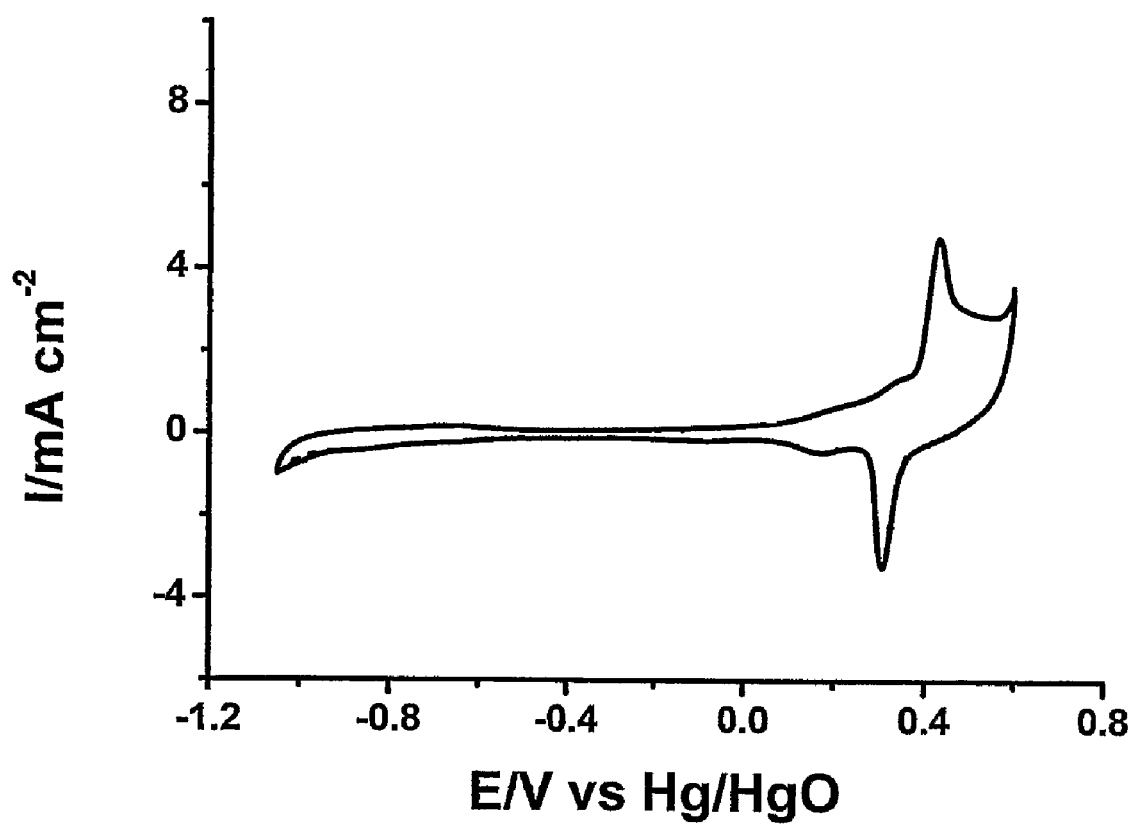
FIG. 7 is a cyclic voltammogram for a 150 nm thick mesoporous Ni film on a top of the golf coated membrane. The Ni mesoporous was characterized electrochemically by cycling in 6 M KOH aqueous between −1.05 V and 0.6 V vs. Hg/HgO at a scan rate of 20 mV s-1.

The templating liquid crystal was sandwiched between the gold surface of the polymer membrane and a carbon counter electrode. A calomel reference electrode was included. The electrodeposition of the Ni films was achieved under potentiostatic and thermostatic control, with a reducing deposition potential of –0.9 V vs. SCE at 25° C. The deposited film thickness was controlled by passing the required deposition charge as calculated by Faraday's Law. The electrodeposition efficiency was 60% and the porosity of the film was 23%. After deposition, samples were allowed to soak in water in order to remove the surfactant and the water was changed every 30 minutes. This was repeated for 5 hours, and then the sample was soaked in water overnight. Samples were rinsed in order to remove the remaining surfactant before electrochemical characterization. The Ni mesoporous films deposited on the membrane were characterized electrochemically by cycling in 6 M KOH aqueous between –1.05 V and 0.6 V vs. Hg/HgO at a scan rate of 20 mV $s^{-1}$. FIG. 7 shows a cyclic voltammogram for a 150 nm thick mesoporous Ni film on a top of the gold coated membrane. The film was deposited with a charge density of 0.6 C $cm^2$. The surface area enhancement over a flat Pt surface of an electrodeposited film was determined by integrating the current passed during the negative sweep of the potential within the range 0.3 and 0.5 V vs. Hg/HgO which attributed to the reduction of a few monolayers of NiOOH and finally converting to a surface area measurement (in units of squared centimetres) assuming a conversion factor of 0.7 mC $cm^{-2}$. This surface area measurement was divided by the geometric area of the electrode to produces a value of 20 for the roughness factor.

The invention claimed is:

1. A nanoporous filter comprising a porous support having an essentially flat surface, on which is deposited a metal nanoporous layer having a substantially regular pore structure, and uniform pore size within the range from 1 to 50 nm.

2. A filter according to claim 1, in which said pore size is from 1 to 20 nm.

3. A filter according to claim 2, in which the pore structure of the nanoporous layer is cubic, lamellar, oblique, centred rectangular, body-centred, orthorhombic, body-centred tetragonal, rhombohedral or hexagonal.

4. A filter according claim 2, in which the nanoporous layer comprises platinum, palladium, gold, silver, nickel, cobalt, copper, iron, lead, tin or indium.

5. A filter according to claim 4, in which the pore structure of the nanoporous layer is cubic, lamellar, oblique, centred rectangular, body-centred, orthorhombic, body-centred tetragonal, rhombohedral or hexagonal.

6. A filter according to claim 1, in which said pore size is from 1.5 to 12 nm.

7. A filter according to claim 6, in which the pore structure of the nanoporous layer is cubic, lamellar, oblique, centred rectangular, body-centred, orthorhombic, body-centred tetragonal, rhombohedral or hexagonal.

8. A filter according to claim 6, in which the nanoporous layer comprises platinum, palladium, gold, silver, nickel, cobalt, copper, iron, lead, tin or indium.

9. A filter according to claim 8, in which the pore structure of the nanoporous layer is cubic, lamellar, oblique, centred rectangular, body-centred, orthorhombic, body-centred tetragonal, rhombohedral or hexagonal.

10. A filter according to claim 1, in which the pore structure of the nanoporous layer is cubic, lamellar, oblique, centred rectangular, body-centred, orthorhombic, body-centred tetragonal, rhombohedral or hexagonal.

11. A filter according to claim 1, in which the pore structure is hexagonal.

12. A filter according to claim 1, in which the nanoporous layer comprises platinum, palladium, gold, silver, nickel, cobalt, copper, iron, lead, tin or indium.

13. A filter according to claim 12, in which the nanoporous layer comprises platinum, palladium or nickel.

14. A filter according to claim 12, in which the nanoporous layer comprises platinum or palladium.

15. A filter according to claim 1, in which the nanoporous layer is from 5 nm to 1 µm thick.

16. A filter according to claim 1, in which the nanoporous layer is from 5 nm to 1 µm thick, in which the pore structure of the nanoporous layer is cubic, lamellar, oblique, centred rectangular, body-centred, orthorhombic, body-centred tetragonal, rhombohedral or hexagonal and in which the nanoporous layer comprises platinum, palladium, gold, silver, nickel, cobalt, copper, iron, lead, tin or indium.

17. A filter according to claim 1, in which the nanoporous layer comprises a transition metal.

18. A method of preparing a nanoporous filter according to claim 1 by depositing a metal nanoporous layer having a substantially regular pore structure and uniform pore size within the range from 1 to 50 nm onto a porous support having an essentially flat surface from an essentially homogeneous lyotropic liquid crystalline phase comprising a solvent, an organic directing agent and a source of the material of the nanoporous layer.

19. A method according to claim 18, in which the solvent is water.

20. A method according to claim 18, in which the organic directing agent is a surface active agent.

21. A method according to claim 19, in which the organic directing agent is a surface active agent.

* * * * *